United States Patent
Wadley et al.

(10) Patent No.: US 12,112,356 B2
(45) Date of Patent: Oct. 8, 2024

(54) SYSTEM FOR INTELLIGENT ASSESSMENT MODELS FOR NON-FUNGIBLE ELECTRONIC RESOURCES

(71) Applicant: BANK OF AMERICA CORPORATION, Charlotte, NC (US)

(72) Inventors: Cameron Darnell Wadley, Waxhaw, NC (US); Katherine Kei-Zen Dintenfass, Lincoln, RI (US); Robert Nyeland Huggins, Charlotte, NC (US); Jinna Zevulun Kim, Charlotte, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 245 days.

(21) Appl. No.: 17/546,156

(22) Filed: Dec. 9, 2021

(65) Prior Publication Data
US 2023/0186353 A1    Jun. 15, 2023

(51) Int. Cl.
*G06Q 30/02* (2023.01)
*G06N 20/00* (2019.01)

(52) U.S. Cl.
CPC ......... *G06Q 30/0278* (2013.01); *G06N 20/00* (2019.01); *G06Q 2220/00* (2013.01)

(58) Field of Classification Search
CPC . G06Q 30/0278; G06Q 2220/00; G06N 20/00
See application file for complete search history.

(56) References Cited

U.S. PATENT DOCUMENTS

| | | |
|---|---|---|
| 7,487,123 B1 | 2/2009 | Keiser et al. |
| 7,778,915 B2 | 8/2010 | Angle et al. |
| 7,895,112 B2 | 2/2011 | Richmann et al. |
| 7,921,051 B2 | 4/2011 | Serkin et al. |
| 7,933,827 B2 | 4/2011 | Richmann et al. |
| 7,974,907 B2 | 7/2011 | Miller et al. |
| 8,132,005 B2 | 3/2012 | Tarkkala et al. |
| 8,190,893 B2 | 5/2012 | Benson et al. |
| 8,244,622 B2 | 8/2012 | Hughes, Jr. et al. |

(Continued)

FOREIGN PATENT DOCUMENTS

CN    113592649 A    *  11/2021

OTHER PUBLICATIONS

Bailey,"Can Machine learning predict the price of art at auction". (Year: 2020).*

(Continued)

*Primary Examiner* — Sangeeta Bahl
(74) *Attorney, Agent, or Firm* — Moore & Van Allen PLLC; Anup Shrinivasan Iyer

(57) ABSTRACT

Systems, computer program products, and methods are described herein for intelligent assessment models for non-fungible electronic resources. The present invention is configured to receive, from a user input device, a request to value a non-fungible token (NFT) of a resource, wherein the NFT is recorded in a distributed ledger; retrieve, using a valuation engine, one or more attributes associated with the NFT from one or more metadata layers of the NFT; initiate a machine learning model on the one or more attributes associated with the NFT; predict, using the machine learning model, a value of the NFT; and transmit control signals configured to cause the user input device to display the value of the NFT.

12 Claims, 2 Drawing Sheets

(56) References Cited

U.S. PATENT DOCUMENTS

| | | |
|---|---|---|
| 8,386,362 B2 | 2/2013 | Failla et al. |
| 8,412,952 B1 | 4/2013 | Ramzan et al. |
| 8,606,685 B2 | 12/2013 | Keiser et al. |
| 11,562,451 B1* | 1/2023 | Kozlowski, III ....... G06F 16/27 |
| 11,769,183 B2* | 9/2023 | Karasulu ............ G06Q 30/0283 |
| | | 705/7.35 |
| 2010/0228674 A1 | 9/2010 | Ogg et al. |
| 2010/0250447 A1 | 9/2010 | Hughes et al. |
| 2011/0231913 A1 | 9/2011 | Feng et al. |
| 2013/0061049 A1 | 3/2013 | Irvine |
| 2013/0238478 A1 | 9/2013 | Bruno |
| 2013/0238903 A1 | 9/2013 | Mizunuma |
| 2013/0254052 A1 | 9/2013 | Royyuru et al. |
| 2014/0280476 A1 | 9/2014 | Chiussi et al. |
| 2014/0344015 A1 | 11/2014 | Puertolas-Montanes et al. |
| 2015/0120567 A1 | 4/2015 | Van Rooyen et al. |
| 2020/0005284 A1* | 1/2020 | Vijayan ................. H04L 9/3247 |
| 2021/0248594 A1* | 8/2021 | Yantis ...................... H04L 9/50 |
| 2021/0256070 A1* | 8/2021 | Tran .................. G06F 16/90332 |
| 2021/0406920 A1* | 12/2021 | McLaney ........... G06Q 20/3224 |
| 2022/0237597 A1* | 7/2022 | Petersen ............. G06Q 20/381 |
| 2022/0383303 A1* | 12/2022 | Mullen ............... G06Q 20/389 |
| 2023/0093031 A1* | 3/2023 | Sharda ................ G06Q 20/123 |
| | | 705/39 |
| 2023/0162179 A1* | 5/2023 | Deng ................. G06Q 20/3823 |
| | | 705/64 |

OTHER PUBLICATIONS

Valeonti "Crypto collectables . . . and potential of NFTs" (Year: 2021).*

* cited by examiner

SYSTEM FOR INTELLIGENT ASSESSMENT MODELS FOR NON-FUNGIBLE ELECTRONIC RESOURCES

FIELD OF THE INVENTION

The present invention embraces a system for intelligent assessment models for non-fungible electronic resources.

BACKGROUND

With the ongoing digitalization of the world, non-fungible tokens (NFTs) are becoming a very viable solution for tokenizing ownership and property. However, determining the precise value of an NFT is difficult, as they are relatively new. While tangible artifacts, such as a piece of art, has defined values, valuing NFTs tends to be tedious. Therefore, there is a need for an intelligent assessment model for non-fungible electronic sources.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, a system for intelligent assessment models for non-fungible electronic resources is presented. The system comprising: at least one non-transitory storage device; and at least one processing device coupled to the at least one non-transitory storage device, wherein the at least one processing device is configured to: receive, from a user input device, a request to value a non-fungible token (NFT) of a resource, wherein the NFT is recorded in a distributed ledger; retrieve, using a valuation engine, one or more attributes associated with the NFT from one or more metadata layers of the NFT; initiate a machine learning model on the one or more attributes associated with the NFT; predict, using the machine learning model, a value of the NFT; and transmit control signals configured to cause the user input device to display the value of the NFT.

In some embodiments, the one or more attributes associated with the NFT comprises at least security status level of the distributed ledger associated with the NFT, metadata storage type, lifetime of the NFT, information associated with a community of the NFT, information associated with a creator of the NFT, NFT scarcity, ownership history of the NFT, value of the resource associated with the NFT, utility of the NFT in virtual mediums, and/or previously recorded valuation of the NFT.

In some embodiments, the at least one processing device is further configured to: crawl one or more distributed ledgers for one or more NFTs with one or more attributes that are same or similar to the one or more attributes of the NFT; retrieve the one or more NFTs with the one or more attributes that are same or similar to the one or more attributes of the NFT; retrieve, from a metadata layer of each of the one or more NFTs, a value of each of the one or more NFTs; and generate a training dataset using at least the one or more attributes of the one or more NFTs and their corresponding value.

In some embodiments, the at least one processing device is further configured to: initiate a machine learning algorithm on the training dataset; and train, using the machine learning algorithm, the machine learning model, wherein training further comprises determining one or more classification parameters for the machine learning model.

In some embodiments, the at least one processing device is further configured to: predict, using one or more classification parameters for the machine learning model, the value of the NFT.

In some embodiments, the at least one processing device is further configured to: determine, using the machine learning model, a confidence level associated with the value of the NFT; and transmit control signals configured to cause the user input device to display the value of the NFT and the confidence level associated with the value.

In some embodiments, the at least one processing device is further configured to: retrieve a unique identification code of the NFT from the request; crawl the distributed ledger to identify the NFT using the unique identification code; and retrieve the NFT from the distributed ledger based on at least the crawling.

In another aspect, a computer program product for intelligent assessment models for non-fungible electronic resources is presented. The computer program product comprising a non-transitory computer-readable medium comprising code causing a first apparatus to: receive, from a user input device, a request to value a non-fungible token (NFT) of a resource, wherein the NFT is recorded in a distributed ledger; retrieve, using a valuation engine, one or more attributes associated with the NFT from one or more metadata layers of the NFT; initiate a machine learning model on the one or more attributes associated with the NFT; predict, using the machine learning model, a value of the NFT; and transmit control signals configured to cause the user input device to display the value of the NFT.

In yet another aspect, a method for intelligent assessment models for non-fungible electronic resources is presented. The method comprising: receiving, from a user input device, a request to value a non-fungible token (NFT) of a resource, wherein the NFT is recorded in a distributed ledger; retrieving, using a valuation engine, one or more attributes associated with the NFT from one or more metadata layers of the NFT; initiating a machine learning model on the one or more attributes associated with the NFT; predicting, using the machine learning model, a value of the NFT; and transmitting control signals configured to cause the user input device to display the value of the NFT.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
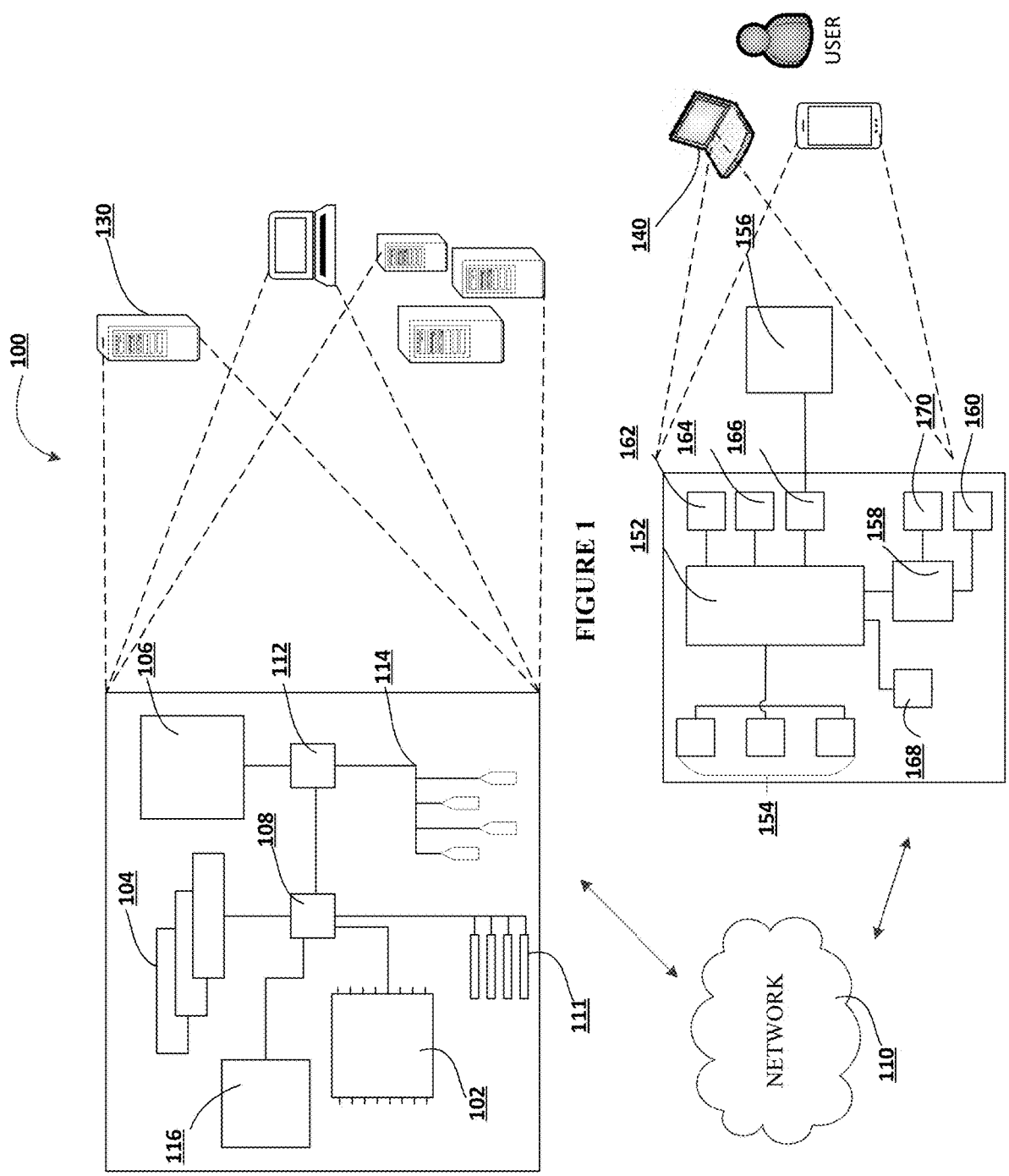
Figure 2:
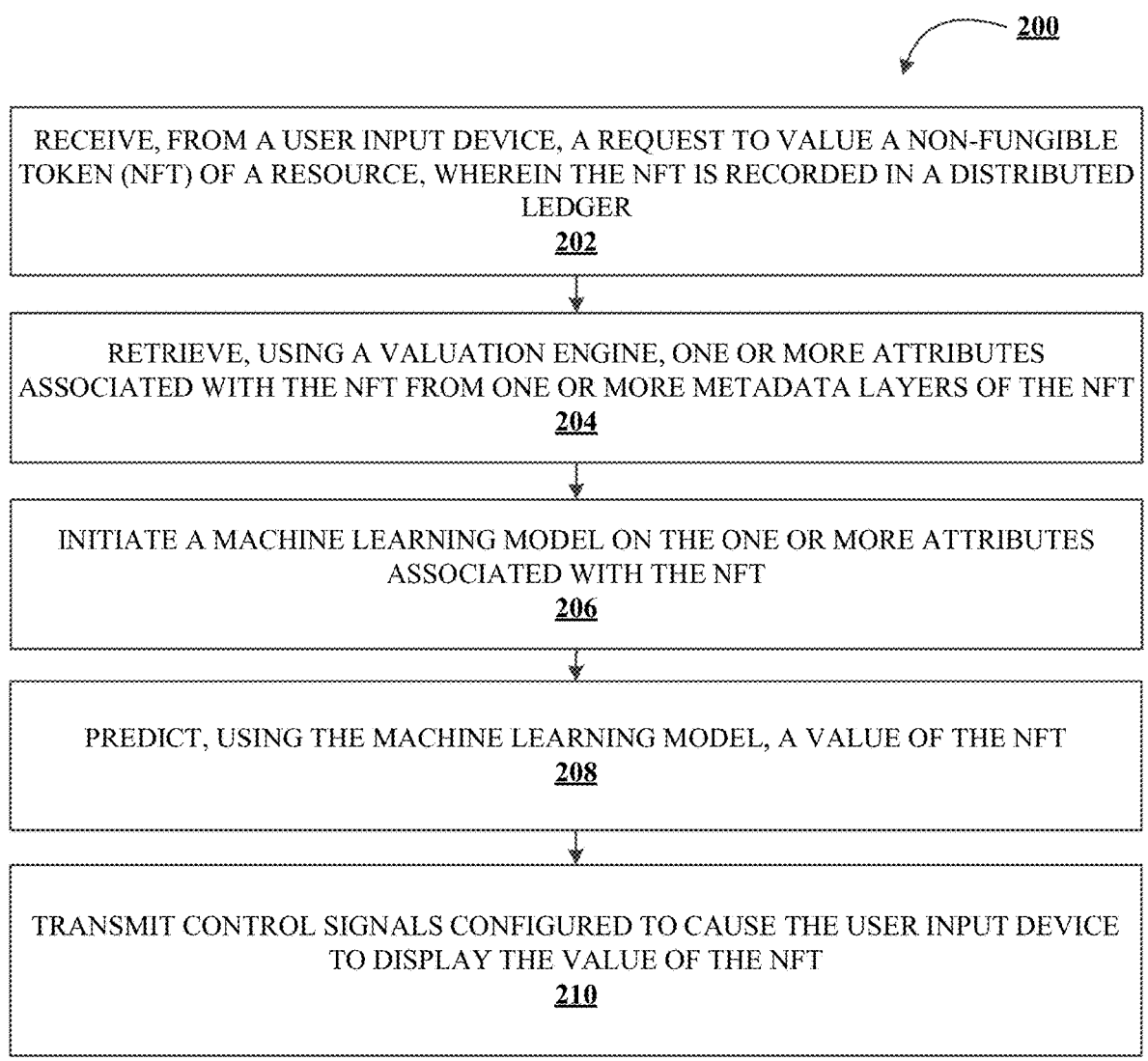

Having thus described embodiments of the invention in general terms, reference will now be made the accompanying drawings, wherein:

FIG. 1 illustrates technical components of a system for intelligent assessment models for non-fungible electronic resources, in accordance with an embodiment of the invention;

FIG. 2 illustrates a process flow for intelligent assessment models for non-fungible electronic resources, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, a "user" may be an employee (e.g., an associate, a project manager, an IT specialist, a manager, an administrator, an internal operations analyst, or the like) of the entity or enterprises affiliated with the entity, capable of operating the systems described herein. In some embodiments, a "user" may be any individual, entity or system who has a relationship with the entity, such as a customer or a prospective customer. In other embodiments, a user may be a system performing one or more tasks described herein.

As used herein, a "user interface" may be any device or software that allows a user to input information, such as commands or data, into a device, or that allows the device to output information to the user. For example, the user interface includes a graphical user interface (GUI) or an interface to input computer-executable instructions that direct a processing device to carry out specific functions. The user interface typically employs certain input and output devices to input data received from a user second user or output data to a user. These input and output devices may include a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of a computer program, or part of a computer program that serves as a foundation for a larger piece of software and drives the functionality of the software. An engine may be self-contained, but externally-controllable code that encapsulates powerful logic designed to perform or execute a specific type of function. In one aspect, an engine may be underlying source code that establishes file hierarchy, input and output methods, and how a specific part of a computer program interacts or communicates with other software and/or hardware. The specific components of an engine may vary based on the needs of the specific computer program as part of the larger piece of software. In some embodiments, an engine may be configured to retrieve resources created in other computer programs, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, and/or one or more devices, nodes, clusters, or systems within the system environment described herein. For example, an interaction may refer to a transfer of data between devices, an accessing of stored data by one or more nodes of a computing cluster, a transmission of a requested task, or the like.

As used herein, a "resource" may generally refer to objects, products, devices, real estate, goods, commodities, services, and the like, and/or the ability and opportunity to access and use the same. Some example implementations herein contemplate digital property held by a user, including property that is stored and/or maintained by a third-party entity.

As used herein, a "resource transfer," "resource distribution," or "resource allocation" may refer to any transaction, activities, or communication between one or more entities, or between the user and the one or more entities in dealing with a resource. A resource transfer may refer to any distribution of resources such as, but not limited to, a payment, processing of funds, purchase of goods or services, a return of goods or services, a payment transaction, a credit transaction, or other interactions involving a user's resource. In some embodiments, the user may authorize a resource transfer using at least a resource transfer instrument (credit cards, debit cards, checks, digital wallets, currency, loyalty points), and/or payment credentials (account numbers, resource transfer instrument identifiers). Unless specifically limited by the context, a "resource transfer" a "transaction", "transaction event" or "point of transaction event" may refer to any activity between a user, a merchant, an entity, or any combination thereof. In some embodiments, a resource transfer or transaction may refer to financial transactions involving direct or indirect movement of funds through traditional paper transaction processing systems (i.e. paper check processing) or through electronic transaction processing systems in dealing with a resource.

As used herein, "machine learning algorithms" may refer to programs (math and logic) that are configured to self-adjust and perform better as they are exposed to more data. To this extent, machine learning algorithms are capable of adjusting their own parameters, given feedback on previous performance in making prediction about a dataset. Machine learning algorithms contemplated, described, and/or used herein include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable machine learning model type. Each of these types of machine learning algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or any suitable form of machine learning algorithm.

As used herein, "machine learning model" may refer to a mathematical model generated by machine learning algorithms based on sample data, known as training data, to make predictions or decisions without being explicitly programmed to do so. The machine learning model represents what was learned by the machine learning algorithm and represents the rules, numbers, and any other algorithm-specific data structures required to for classification.

As used herein, a "non-fungible token" or "NFT" may refer to a digital unit of data used as a unique digital identifier for a resource. An NFT may be stored on a distributed ledger that certifies ownership and authenticity of the resource. For purposes of this invention, a distributed ledger (e.g., blockchain) may be a database that is consensually shared and synchronized across multiple sites, institutions, or geographies, accessible by multiple people. A distributed ledger may be associated with independent computers (referred to as nodes) that record, share and synchronize transactions in their respective electronic ledgers (instead of keeping data centralized as in a traditional ledger). As such, NFTs cannot be copied, substituted, or subdivided. In specific embodiments, the NFT may include at least relationship layer, a token layer, a metadata layer(s), and a licensing layer. The relationship layer may include a map of various users that are associated with the NFT and their relationship to one another. For example, if the NFT is purchased by buyer B1 from a seller S1, the relationship between B1 and S1 as a buyer-seller is recorded in the relationship layer. In another example, if the NFT is owned by O1 and the resource itself is stored in a storage facility by storage provider SP1, then the relationship between O1 and SP1 as owner-file storage provider is recorded in the relationship layer. The token layer may include a smart contract that points to a series of metadata associated with the resource, and provides information about supply, authenticity, lineage, and provenance of the resource. The metadata layer(s) may include resource descriptors that provides information about the resource itself (e.g., resource information). These resource descriptors may be stored in the same metadata layer or grouped into multiple metadata layers. The licensing layer may include any restrictions and licensing rules associated with purchase, sale, and any other types of transfer of the resource from one person to another. Those skilled in the art will appreciate that various additional layers and combinations of layers can be configured as needed without departing from the scope and spirit of the invention.

As used herein, a "distributed ledger" may refer to a consensus of replicated and synchronized data geographically shared across multiple nodes on a network. Without using a centralized data storage, each distributed ledger database replicates and saves an identical copy of the ledger. A distributed ledger may employ executing codes, also known as smart contracts, to manage transactions and store records of transactions among disparate participants in the distributed ledger-based network (DLN) without the need for a central authority.

With the ongoing digitalization of the world, non-fungible tokens (NFTs) are becoming a very viable solution for tokenizing ownership and property. However, determining the precise value of an NFT is difficult, as they are relatively new. While tangible artifacts, such as a piece of art, has defined values, valuing NFTs tends to be tedious. Therefore, there is a need for an intelligent assessment model for non-fungible electronic sources. The present invention provides the functional benefit of leveraging machine learning techniques to predict a value of an NFT.

FIG. 1 presents an exemplary block diagram of the system environment for intelligent assessment models for non-fungible electronic resources 100, in accordance with an embodiment of the invention. FIG. 1 provides a unique system that includes specialized servers and system communicably linked across a distributive network of nodes required to perform the functions of the process flows described herein in accordance with embodiments of the present invention.

As illustrated, the system environment 100 includes a network 110, a system 130, and a user input device 140. In some embodiments, the system 130, and the user input device 140 may be used to implement the processes described herein, in accordance with an embodiment of the present invention. In this regard, the system 130 and/or the user input device 140 may include one or more applications stored thereon that are configured to interact with one another to implement any one or more portions of the various user interfaces and/or process flow described herein. For example, the system 130 and/or the user input device 140 may include augmented and/or virtual reality applications configured to create immersive visual environments that make up the metaverse. These applications not only allow the user to access the metaverse, but also enable users to communicate with other users accessing the metaverse within the immersive visual environments.

In accordance with embodiments of the invention, the system 130 is intended to represent various forms of digital computers, such as laptops, desktops, video recorders, audio/video player, radio, workstations, servers, wearable devices, Internet-of-things devices, electronic kiosk devices, blade servers, mainframes, or any combination of the aforementioned capable of running applications required to execute the processes describe herein. In accordance with embodiments of the invention, the user input device 140 is intended to represent various forms of mobile devices, such as personal digital assistants, cellular telephones, smartphones, augmented reality (AR) devices, virtual reality (VR) devices, extended reality (XR) devices, and other similar computing devices capable of running applications required to execute the processes describe herein. The components shown here, their connections and relationships, and their functions, are meant to be exemplary only, and are not meant to limit implementations of the inventions described and/or claimed in this document.

In accordance with some embodiments, the system 130 may include a processor 102, memory 104, a storage device 106, a high-speed interface 108 connecting to memory 104, and a low-speed interface 112 connecting to low speed bus 114 and storage device 106. Each of the components 102, 104, 106, 108, 111, and 112 are interconnected using various buses, and may be mounted on a common motherboard or in other manners as appropriate. The processor 102 can process instructions for execution within the system 130, including instructions stored in the memory 104 or on the storage device 106 to display graphical information for a GUI on an external input/output device, such as display 116 coupled to a high-speed interface 108. In other implementations, multiple processors and/or multiple buses may be used, as appropriate, along with multiple memories and types of memory. Also, multiple systems, same or similar to system 130 may be connected, with each system providing portions of the necessary operations (e.g., as a server bank, a group of blade servers, or a multi-processor system). In some embodiments, the system 130 may be a server managed by the business. The system 130 may be located at the facility associated with the business or remotely from the facility associated with the business.

The memory 104 stores information within the system 130. In one implementation, the memory 104 is a volatile memory unit or units, such as volatile random access memory (RAM) having a cache area for the temporary storage of information. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like. The memory 104 may store any one or more of pieces of information and data used by the system in which it resides to implement the functions of that system. In this regard, the system may dynamically utilize the volatile memory over the non-volatile memory by storing multiple pieces of information in the volatile memory, thereby reducing the load on the system and increasing the processing speed.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

In some embodiments, the system 130 may be configured to access, via the network 110, a number of other computing devices (not shown) in addition to the user input device 140. In this regard, the system 130 may be configured to access one or more storage devices and/or one or more memory devices associated with each of the other computing devices. In this way, the system 130 may implement dynamic allocation and de-allocation of local memory resources among multiple computing devices in a parallel or distributed system. Given a group of computing devices and a collection of interconnected local memory devices, the fragmentation of memory resources is rendered irrelevant by configuring the system 130 to dynamically allocate memory based on availability of memory either locally, or in any of the other computing devices accessible via the network. In effect, it appears as though the memory is being allocated from a central pool of memory, even though the space is distributed throughout the system. This method of dynamically allocating memory provides increased flexibility when the data size changes during the lifetime of an application and allows memory reuse for better utilization of the memory resources when the data sizes are large.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, display 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms, as shown in FIG. 1. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1 also illustrates a user input device 140, in accordance with an embodiment of the invention. The user input device 140 includes a processor 152, memory 154, an input/output device such as a display 156, a communication interface 158, and a transceiver 160, among other components. The user input device 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the user input device 140, including instructions stored in the memory 154. The processor may be implemented as a chipset of chips that include separate and multiple analog and digital processors. The processor may be configured to provide, for example, for coordination of the other components of the user input device 140, such as control of user interfaces, applications run by user input device 140, and wireless communication by user input device 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of user input device 140 with other devices. External interface 168 may provide, for example, for wired communication in some implementations, or for wireless communication in other implementations, and multiple interfaces may also be used.

The memory 154 stores information within the user input device 140. The memory 154 can be implemented as one or more of a computer-readable medium or media, a volatile memory unit or units, or a non-volatile memory unit or units. Expansion memory may also be provided and connected to user input device 140 through an expansion interface (not shown), which may include, for example, a SIMM (Single In Line Memory Module) card interface. Such expansion memory may provide extra storage space for user input device 140 or may also store applications or other information therein. In some embodiments, expansion memory may include instructions to carry out or supplement the processes described above and may include secure information also. For example, expansion memory may be provided as a security module for user input device 140 and may be programmed with instructions that permit secure use of user input device 140. In addition, secure applications may be provided via the SIMM cards, along with additional information, such as placing identifying information on the SIMM card in a non-hackable manner. In some embodiments, the user may use the applications to execute processes described with respect to the process flows described herein. Specifically, the application executes the process flows described herein.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer-or machine-readable medium, such as the memory 154, expansion memory, memory on processor 152, or a propagated signal that may be received, for example, over transceiver 160 or external interface 168.

In some embodiments, the user may use the user input device 140 to transmit and/or receive information or commands to and from the system 130 via the network 110. Any communication between the system 130 and the user input device 140 (or any other computing devices) may be subject to an authentication protocol allowing the system 130 to maintain security by permitting only authenticated users (or processes) to access the protected resources of the system 130, which may include servers, databases, applications, and/or any of the components described herein. To this end, the system 130 may require the user (or process) to provide authentication credentials to determine whether the user (or process) is eligible to access the protected resources. Once the authentication credentials are validated and the user (or process) is authenticated, the system 130 may provide the user (or process) with permissioned access to the protected resources. Similarly, the user input device 140 (or any other computing devices) may provide the system 130 with permissioned to access the protected resources of the user input device 130 (or any other computing devices), which may include a GPS device, an image capturing component (e.g., camera), a microphone, a speaker, and/or any of the components described herein.

The user input device 140 may communicate with the system 130 (and one or more other devices) wirelessly through communication interface 158, which may include digital signal processing circuitry where necessary. Communication interface 158 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 160. In addition, short-range communication may occur, such as using a Bluetooth, Wi-Fi, or other such transceiver (not shown). In addition, GPS (Global Positioning System) receiver module 170 may provide additional navigation- and location-related wireless data to user input device 140, which may be used as appropriate by applications running thereon, and in some embodiments, one or more applications operating on the system 130.

The user input device 140 may also communicate audibly using audio codec 162, which may receive spoken information from a user and convert it to usable digital information. Audio codec 162 may likewise generate audible sound for a user, such as through a speaker, e.g., in a handset of user input device 140. Such sound may include sound from voice telephone calls, may include recorded sound (e.g., voice messages, music files, etc.) and may also include sound generated by one or more applications operating on the user input device 140, and in some embodiments, one or more applications operating on the system 130.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a technical environment that includes a back end component (e.g., as a data server), that includes a middleware component (e.g., an application server), that includes a front end component (e.g., a client computer having a graphical user interface or a Web browser through which a user can interact with an implementation of the systems and techniques described here), or any combination of such back end, middleware, or front end components.

As shown in FIG. 1, the components of the system 130 and the user input device 140 are interconnected using the network 110. The network 110, which may be include one or more separate networks, be a form of digital communication network such as a telecommunication network, a local area network ("LAN"), a wide area network ("WAN"), a global area network ("GAN"), the Internet, or any combination of the foregoing. It will also be understood that the network 110 may be secure and/or unsecure and may also include wireless and/or wired and/or optical interconnection technology.

In accordance with an embodiments of the invention, the components of the system environment 100, such as the system 130 and the user input device 140 may have a client-server relationship, where the user input device 130 makes a service request to the system 130, the system 130 accepts the service request, processes the service request, and returns the requested information to the user input device 140, and vice versa. This relationship of client and server typically arises by virtue of computer programs running on the respective computers and having a client-server relationship to each other.

It will be understood that the embodiment of the system environment 100 illustrated in FIG. 1 is exemplary and that other embodiments may vary. As another example, in some embodiments, the system environment may include more, fewer, or different components. As another example, in some embodiments, some or all of the portions of the system environment 100 may be combined into a single portion. Likewise, in some embodiments, some, or all of the portions of the system 130 may be separated into two or more distinct portions.

FIG. 2 illustrates a process flow for intelligent assessment models for non-fungible electronic resources 200, in accordance with an embodiment of the invention. As shown in block 202, the process flow includes receiving, from a user input device, a request to value a non-fungible token (NFT) of a resource, wherein the NFT is recorded in a distributed ledger. In some embodiments, the system may be configured to retrieve a unique identification code of the NFT from the request. Using the unique identification code, the system may be configured to crawl the distributed ledger to identify and retrieve the NFT.

Next, as shown in block 204, the process flow includes retrieving, using a valuation engine, one or more attributes associated with the NFT from one or more metadata layers of the NFT. In some embodiments, the one or more attributes associated with the NFT may include at least security status level of the distributed ledger associated with the NFT. While distributed ledgers are typically more secure than traditional databases, they can differ in who is allowed to participate, and permissioned or permissionless, which describes how participants gain access to the network. For example, public networks typically allow anyone to join and for participants to remain anonymous while private networks use identity to confirm membership and access privileges and typically only permit known entities to join. Thus, the security status level of a public network may be lower than that of a permissioned private network. Depending on the type of network in which the NFT is currently record, the value of the NFT may vary.

In some embodiments, the one or more attributes associated with the NFT may include metadata storage type. There is potential vulnerability that exists in the way that the resource (content and metadata) represented by the NFT may be stored. Typically, the NFTs exist in two parts—the smart contract and the metadata for the actual resource. The smart contract exists on a distributed ledger and contains a set of rules or standards that facilitates the transaction and serves as a description of the resource. The smart contract includes a link that points to the server that stores the resource. On the other hand, the resource may not live on the distributed ledger and may be stored off-chain—centralized servers managed and maintained by a third party. The issue with centralized storage is that if the server goes down the image may be lost. Depending on where the NFT is hosted, i.e., whether the NFT is "on-chain" or "off-chain," the value of the NFT may vary.

In some embodiments, the one or more attributes associated with the NFT may include lifetime of the NFT, i.e., rarity, which translated to how rare and "hard-to-get" a specific NFT is. For example, an NFT that is associated with a first-of-its-kind artwork from a famous creator in the digital arts industry may have a high value. In some embodiments, the one or more attributes associated with the NFT may include information associated with a creator and community of the NFT. For example, an NFT created by a famous celebrity or the effect such an NFT would provide in, for example, a virtual world may affect the value of the NFT. Other attributes taken into consideration when determining the value of the NFT may include the original value of the resource associated with the NFT, utility of the NFT in virtual mediums, previously recorded valuation of the NFT, and/or the like.

Next, as shown in block 206, the process flow includes initiating a machine learning model on the one or more attributes associated with the NFT. Machine learning is one of the cutting edge techniques that can be used to identify, interpret, and analyze complicated data structures and patterns. It allows consequential learning and improves model predictions with a systematic input of more recent data. As described herein, a machine learning model may refer to a mathematical model generated by machine learning algorithms based on sample data, known as training data, to make predictions or decisions without being explicitly programmed to do so. Using the machine learning model, the system may be configured to predict the value of the NFT.

To generate the machine learning model capable of predicting the value of the NFT, the machine learning model has to be trained using known valuations of NFTs with same or similar attributes. Accordingly, the system may be configured to crawl one or more distributed ledgers to identify and retrieve one or more NFTs with one or more attributes that are same or similar to the one or more attributes of the NFT. Then, the system may be configured to retrieve, from a metadata layer of each of the one or more NFTs, a value of each of the one or more NFTs. These values may be previously known and recorded by entities such as accredited auction houses. The value of each NFT and its corresponding attributes form the training dataset for the machine learning model. This training dataset is then used to train the machine learning model using one or more machine learning algorithms (e.g., random forest algorithm, support vector machines, or the like). Once trained, the system may be configured to determine classification parameters for the machine learning model that are then used to predict values of previously unseen NFTs.

Next, as shown in block 208, the process flow includes predicting, using the machine learning model, a value of the NFT. In some embodiments, in addition to predicting the value of the NFT, the system may be configured to determine, using the machine learning model, a confidence level associated with the predicted value of the NFT. In some embodiments, a confidence level may be represented in the form of a number (e.g., between 0 and 1) that represents the likelihood that the output of machine learning model, i.e., predicted value of the NFT, is correct and will satisfy the user's request.

Next, as shown in block 210, the process flow includes transmitting control signals configured to cause the user input device to display the value of the NFT. In some embodiments, the confidence level associated with the predicted value of the NFT may be displayed on the user input device.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A system for intelligent assessment models for non-fungible electronic resources, the system comprising:
    at least one non-transitory storage device; and
    at least one processing device coupled to the at least one non-transitory storage device, wherein the at least one processing device is configured to:
        receive, from a user input device, a request to value a non-fungible token (NFT) of a resource, wherein the NFT is recorded in a distributed ledger;
        retrieve a unique identification code of the NFT from the request;
        crawl the distributed ledger to identify the NFT using the unique identification code;
        retrieve, using a valuation engine, one or more attributes associated with the NFT from one or more metadata layers of the NFT;
        crawl one or more distributed ledgers for one or more NFTs with one or more attributes that are same or similar to the one or more attributes of the NFT;
        retrieve the one or more NFTs with the one or more attributes that are same or similar to the one or more attributes of the NFT;
        retrieve, from a metadata layer of each of the one or more NFTs, a value of each of the one or more NFTs;
        generate a training dataset using at least the one or more attributes of the one or more NFTs and their corresponding value;
        initiate a machine learning algorithm on the training dataset;
        train, using the machine learning algorithm, a machine learning model, wherein training further comprises determining one or more classification parameters for the machine learning model;
        initiate the machine learning model on the one or more attributes associated with the NFT;
        predict, using the one or more classification parameters of the machine learning model, a value of the NFT; and
        transmit control signals configured to cause the user input device to display the predicted value of the NFT.

2. The system of claim 1, wherein the one or more attributes associated with the NFT comprises at least security status level of the distributed ledger associated with the NFT, metadata storage type, lifetime of the NFT, information associated with a community of the NFT, information associated with a creator of the NFT, NFT scarcity, ownership history of the NFT, value of the resource associated with the NFT, utility of the NFT in virtual mediums, and/or previously recorded valuation of the NFT.

3. The system of claim 1, wherein the at least one processing device is further configured to:
    predict, using one or more classification parameters for the machine learning model, the value of the NFT.

4. The system of claim 3, wherein the at least one processing device is further configured to:
    determine, using the machine learning model, a confidence level associated with the value of the NFT; and
    transmit control signals configured to cause the user input device to display the value of the NFT and the confidence level associated with the value.

5. A computer program product for intelligent assessment models for non-fungible electronic resources, the computer program product comprising a non-transitory computer-readable medium comprising code causing a first apparatus to:
- receive, from a user input device, a request to value a non-fungible token (NFT) of a resource, wherein the NFT is recorded in a distributed ledger;
- retrieve a unique identification code of the NFT from the request;
- crawl the distributed ledger to identify the NFT using the unique identification code;
- retrieve, using a valuation engine, one or more attributes associated with the NFT from one or more metadata layers of the NFT;
- crawl one or more distributed ledgers for one or more NFTs with one or more attributes that are same or similar to the one or more attributes of the NFT;
- retrieve the one or more NFTs with the one or more attributes that are same or similar to the one or more attributes of the NFT;
- retrieve, from a metadata layer of each of the one or more NFTs, a value of each of the one or more NFTs;
- generate a training dataset using at least the one or more attributes of the one or more NFTs and their corresponding value;
- initiate a machine learning algorithm on the training dataset;
- train, using the machine learning algorithm, a machine learning model, wherein training further comprises determining one or more classification parameters for the machine learning model;
- initiate the machine learning model on the one or more attributes associated with the NFT;
- predict, using the one or more classification parameters of the machine learning model, a value of the NFT; and
- transmit control signals configured to cause the user input device to display the value of the NFT.

6. The computer program product of claim 5, wherein the one or more attributes associated with the NFT comprises at least security status level of the distributed ledger associated with the NFT, metadata storage type, lifetime of the NFT, information associated with a community of the NFT, information associated with a creator of the NFT, NFT scarcity, ownership history of the NFT, value of the resource associated with the NFT, utility of the NFT in virtual mediums, and/or previously recorded valuation of the NFT.

7. The computer program product of claim 5, wherein the code further causes the first apparatus to:
- predict, using one or more classification parameters for the machine learning model, the value of the NFT.

8. The computer program product of claim 7, wherein the code further causes the first apparatus to:
- determine, using the machine learning model, a confidence level associated with the value of the NFT; and
- transmit control signals configured to cause the user input device to display the value of the NFT and the confidence level associated with the value.

9. A method for intelligent assessment models for non-fungible electronic resources, the method comprising:
- receiving, from a user input device, a request to value a non-fungible token (NFT) of a resource, wherein the NFT is recorded in a distributed ledger;
- retrieving a unique identification code of the NFT from the request;
- crawling the distributed ledger to identify the NFT using the unique identification code;
- retrieving, using a valuation engine, one or more attributes associated with the NFT from one or more metadata layers of the NFT;
- crawling one or more distributed ledgers for one or more NFTs with one or more attributes that are same or similar to the one or more attributes of the NFT;
- retrieving the one or more NFTs with the one or more attributes that are same or similar to the one or more attributes of the NFT;
- retrieving, from a metadata layer of each of the one or more NFTs, a value of each of the one or more NFTs;
- generating a training dataset using at least the one or more attributes of the one or more NFTs and their corresponding value;
- initiating a machine learning algorithm on the training dataset;
- training, using the machine learning algorithm, a machine learning model, wherein training further comprises determining one or more classification parameters for the machine learning model;
- initiating the machine learning model on the one or more attributes associated with the NFT;
- predicting, using the one or more classification parameters of the machine learning model, a value of the NFT; and
- transmitting control signals configured to cause the user input device to display the value of the NFT.

10. The method of claim 9, wherein the one or more attributes associated with the NFT comprises at least security status level of the distributed ledger associated with the NFT, metadata storage type, lifetime of the NFT, information associated with a community of the NFT, information associated with a creator of the NFT, NFT scarcity, ownership history of the NFT, value of the resource associated with the NFT, utility of the NFT in virtual mediums, and/or previously recorded valuation of the NFT.

11. The method of claim 9, wherein the method further comprises:
- predicting, using one or more classification parameters for the machine learning model, the value of the NFT.

12. The method of claim 11, wherein the method further comprises:
- determining, using the machine learning model, a confidence level associated with the value of the NFT; and
- transmitting control signals configured to cause the user input device to display the value of the NFT and the confidence level associated with the value.

* * * * *